United States Patent [19]

Luetzelschwab

[11] 4,402,916

[45] Sep. 6, 1983

[54] DILUTION APPARATUS AND METHOD

[75] Inventor: Wayne E. Luetzelschwab, Littleton, Colo.

[73] Assignee: Marathon Oil Company, Findlay, Ohio

[21] Appl. No.: 279,027

[22] Filed: Jun. 30, 1981

[51] Int. Cl.[3] .............................................. B01D 12/00

[52] U.S. Cl. .................................... 422/256; 422/901; 366/336

[58] Field of Search ........................ 422/901, 256, 257; 366/336

[56] References Cited

U.S. PATENT DOCUMENTS 2,125,245 6/1935 McCray ................................ 138/42
3,988,010 10/1976 Paster .................................. 422/256
4,068,830 1/1978 Gray .................................. 366/176

*Primary Examiner*—Joseph L. Schofer
*Assistant Examiner*—N. Sarofim
*Attorney, Agent, or Firm*—Jack L. Hummel

[57] ABSTRACT

Apparatus, and method, for diluting polymer solutions of a known concentration to a preselected lower concentration without any concomitant degradation or thinning of the polymer comprising the solution. The apparatus comprises an elongated chamber desirably in the form of a cylinder or tube having polymer solution dispersing stations arranged in spaced relation therealong. The dispersing stations comprise at least one perforated plate or screen. The perforations in the plates or screens diminish in size as the polymer solution and a diluent for the solution advance in the direction of the outlet or discharge end of the chamber. Flow control means desirably are positioned between one, or more, of the dispersing stations. In accordance with the method aspects of the invention, a polymer solution of a known concentration is successively dispersed in a manner to enable increasing amounts of a diluent to be taken-up or absorbed by the polymer solution until the concentration of the polymer in the final solution attains a predetermined lower concentration.

6 Claims, 3 Drawing Figures

FIG-1- FIG-2-
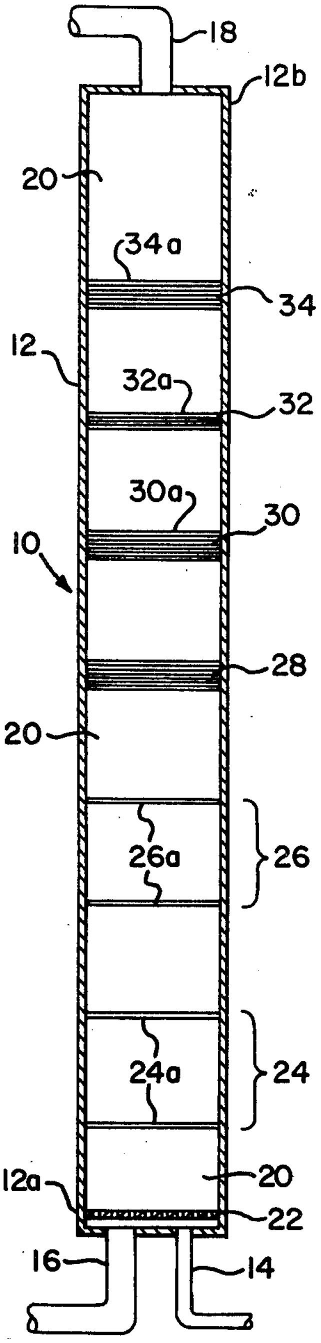
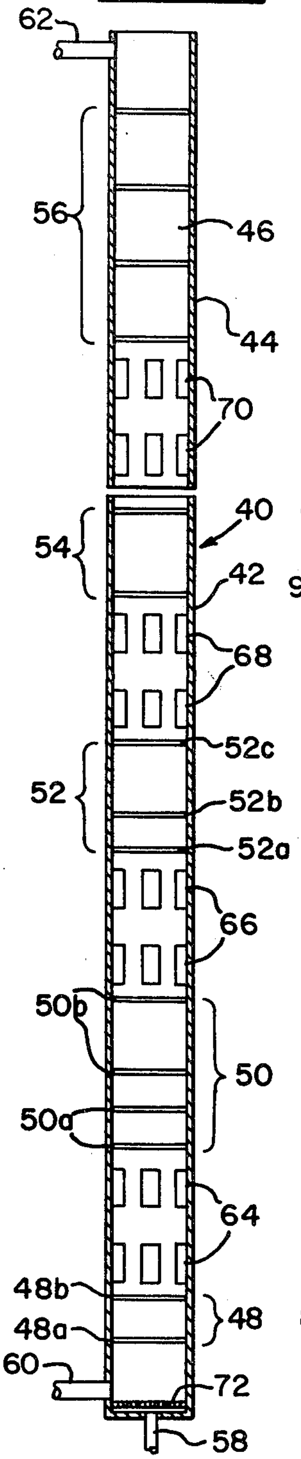
FIG-3-
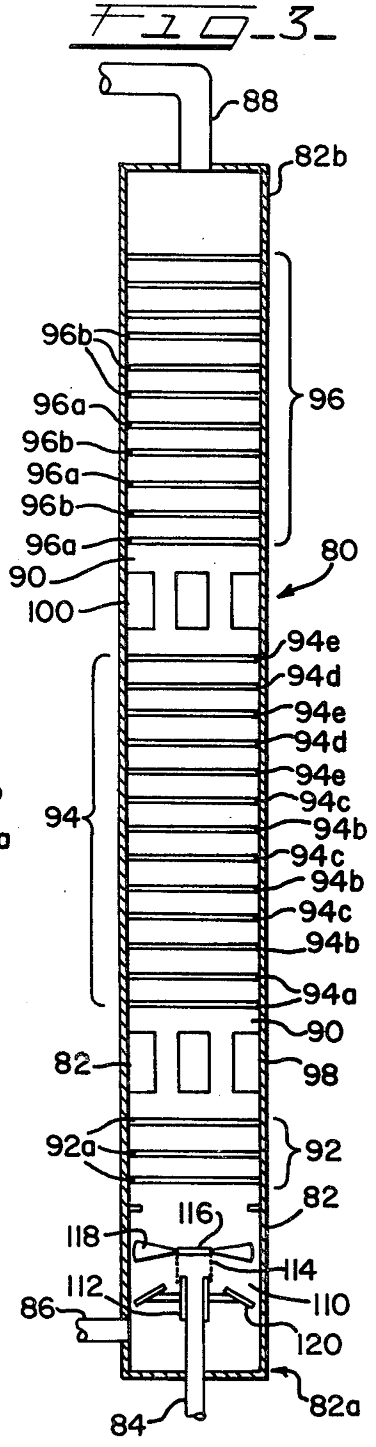

DILUTION APPARATUS AND METHOD

DESCRIPTION

TECHNICAL FIELD

The present invention relates to apparatus, and to a method, for diluting polymer solutions of known concentration to a preselected, lower concentration without any concomitant degradation or thinning of the polymers comprising the solutions.

BACKGROUND OF PRIOR ART

It is known to employ an elongated cylinder or tube containing a plurality of perforated plates to disperse a solid, semi-solid, or viscous material into a fluid. Thus, for example, in U.S. Pat. No. 2,125,245, there is disclosed a vertically positioned tube, provided with a number of transverse, perforated plates, for dispersing materials such as asphalt, paraffin, and thermoplastic hydrocarbons into a fluid such as water. Baffles, having a restricted passage or opening along the margin thereof, are located between each of the perforated plates. The asphalt, or other material, is heat liquified before it is introduced into the cylinder or tube. Exemplary of another device for mixing or blending materials is that shown in U.S. Pat. No. 3,045,984. The device of that patent comprises an elongated cylinder having a series of baffles secured to opposite sides of the inner wall of the cylinder. Each of the baffles is provided with an opening therethrough to aid in mixing or blending the materials in the cylinder as they pass from the inlet to the outlet end thereof. Other patents showing apparatus for intermixing materials and fluids include U.S. Pat. Nos. 2,312,639; 2,391,110; 3,885,368; 4,068,830; and 4,136,976. None of the aforementioned patents, however, are concerned with the problems involved in diluting certain polymer solutions, especially polymer solutions of the type used in the secondary and tertiary recovery of oil.

BRIEF SUMMARY OF INVENTION

Aqueous solutions of polyacrylamides, especially partially hydrolyzed polyacrylamides, have been widely used as drive fluids and/or mobility buffers in the secondary or tertiary recovery of oil from subterranean formations or reservoirs. The aqueous solutions are prepared by polymerizing an acrylamide monomer and then reacting the polymer with a monovalent base such as dilute sodium hydroxide to hydrolyze a predetermined mole percent of the amide groups comprising the polymer. The concentration of the partially hydrolyzed polymer in the aqueous solution is of the order of 6 percent, and the solution has a gel-like consistency. The 6 percent solution is then contacted with water to form a 1 percent, by weight, solution of the partially hydrolyzed polyacrylamide, a process which takes from 10 to 12 hours, or longer, to attain a uniform solution. Efforts to speed up the formation of a 1 percent solution from the 6 percent solution of the polymer heretofore have resulted in serious degradation or thinning of the polymer due to shear forces developed during dilution. As a result, the injectivity and the mobility properties of the aqueous polymer solution are adversely affected, and, concomitantly, the performance capabilities of the polymer solution are both appreciably diminished and unpredictable. These factors greatly reduce the efficiency of the polymer solution and increase the costs of the oil recovery operation.

The apparatus and method of the present invention enable the dilution of polymer solutions, such as aqueous solutions of partially hydrolyzed polyacrylamides, to be achieved quickly and without any adverse affects on the properties of the polymer comprising the solution. Degradation or thinning of the polymer due to shear forces is essentially eliminated, or at least reduced to a level which does not alter the performance capabilities of the polymer solutions. The increased efficiency in oil recovery attained with polymer solutions diluted in accordance with the practice of the present invention significantly lowers the cost of the recovery operation in that smaller volumes of the solutions are required.

The apparatus of the invention, in brief, comprises an elongated chamber having an inlet end for introducing a polymer solution at one concentration into the chamber and an outlet end for discharging or removing the polymer solution at another lower concentration from the chamber. Polymer solution distributor means is located at the inlet end of the chamber for dispersing and distributing the polymer solution as it enters the chamber. Conduit means is provided for introducing a fluid for diluting the polymer solution in the chamber. A plurality of spaced polymer solution dispersing stations are positioned in the chamber, each of said stations comprising at least one perforated member, and at least one of the stations comprising a plurality of perforated members. In a preferred embodiment of the apparatus, the size of the openings in the perforated members are largest at the inlet end of the chamber, and smallest adjacent the outlet end thereof. Flow control means advantageously is positioned between at least two of the dispersing stations to improve the flow pattern of the polymer solution as it moves through each successive dispersing station in the chamber.

In accordance with the method aspects of the invention, a polymer solution of relatively high concentration is introduced into a chamber by initially passing it through distributor means to disperse the polymer and increase its surface area. As the dispersed polymer solution enters the chamber, it is contacted with a diluent which is taken-up or absorbed by the polymer. The partially diluted polymer solution is continuously and successively passed through a plurality of dispersing stations in the chamber, each station serving to progressively increase the surface area, and to expose previously unexposed surface areas of the polymer to enable greater amounts of the diluent to be taken-up or absorbed until the concentration of the polymer in the solution has reached a predetermined level. The diluted solution is then discharged from an outlet at the opposite end of the chamber. As the polymer solution passes from one dispersing station to the next, the flow pattern of the solution advantageously is controlled in a manner to promote uniformity in the solution. In this connection, it should be mentioned that flow distribution becomes a factor as the diameter of the dilution chamber is increased. Following removal from the diluting chamber, the polymer solution can be further diluted for injection, for example, into an input well of an oil-bearing reservoir.

The foregoing, and other features and advantages of the invention will become more apparent from the description to follow, taken in conjunction with the accompanying drawings.

BRIEF DESCRIPTION OF THE DRAWINGS

FIG. 1 is a somewhat schematic representation shown in elevation, of an embodiment of the apparatus of this invention; and, FIGS. 2 and 3 are views similar to that of FIG. 1 of other embodiments of the apparatus of the invention, showing flow control means between the dispersing stations.

DETAILED DESCRIPTION OF INVENTION

Referring, now, in greater detail to FIG. 1 of the drawings, the embodiment of the invention shown, and designated generally by reference numeral 10, comprises an elongated cylinder or tube 12 having an inlet end 12*a* and an outlet end 12*b*. The tube 12 may be fabricated of a corrosion resistant metal or plastic, and can have an overall length of from about 2 feet to about 8 feet and an internal diameter of the order of about 2 inches to about 8 inches, preferably from about 4 to about 6 inches. The tube 12 advantageously is formed in separable sections (not shown) to facilitate access to the interior thereof. The inlet end 12*a* of the tube 12 is provided with openings for connecting the end of a polymer solution conduit 14 and a fluid diluent conduit 16 to the tube 12. The internal diameter of the conduits 14 and 16 can be varied in accordance with the nature of the material to be diluted. Thus, for example, where the material is a 6%, by weight, aqueous solution of a partially hydrolyzed polyacrylamide which is to be diluted down to a 1%, by weight, solution of the polymer, the internal diameter of the polymer solution conduit 14 will be approximately half that of the fluid diluent conduit 16. The outlet end 12*b* of the tube 12 has an opening for connecting an end of a polymer solution discharge conduit 18.

The tube 12 defines a chamber 20 having a polymer solution distributor disk or plate 22 positioned at the lower end thereof. The disk or plate 22 is provided with a plurality of holes which may range in size from approximately 1/32 inch to approximately 3/32 inch, preferably about 1/16 inch in diameter, and serves to initially disperse and increase the surface area of the polymer as it enters the tube 12 through the conduit 14. The chamber 20 of the embodiment of the apparatus shown in FIG. 1 also is provided with a plurality of spaced polymer solution dispersing stations 24, 26, 28, 30, 32 and 34. The dispersing station 24 comprises a pair of spaced disks 24*a*–24*a*, each having perforations provided therethrough of about ⅛ inch. The dispersing station 26 likewise comprises a pair of spaced disks 26*a*–26*a* having perforations therethrough of approximately 1/16 inch in diameter. Station 28 as shown, comprises a plurality of screens, preferably 6 in number in stacked, superposed, contiguous, or near contiguous, relation to one another, each screen having a mesh size of approximately 10. The station 30 likewise comprises a plurality of screens also preferably 6 in number and stacked as in the case of the screens comprising the station 28, each screen having a mesh size of approximately 16. The station 32 comprises three screens having a mesh size of approximately 20, while the station 34 comprises a plurality of screens, again preferably 6 in number and stacked as in the case of the screens comprising the stations 28 and 30, each screen having a mesh size of approximately 20. The screens comprising the stations 30, 32 and 34 are each advantageously provided with a single screen 30*a*, 32*a* and 34*a*, respectively, having a mesh size of approximately 6, which acts as a support for the remainder of the screens comprising each of said stations. The disks and screens forming each of the dispersing stations in the chamber 20 may be fabricated of a chemical resistant, noncorrosive material such as stainless steel.

Referring now in greater detail to FIG. 2 of the drawing, the embodiment there shown and designated generally by reference numeral 40, comprises two interconnectible cylinders or tubes 42 and 44 of different lengths. The tubes, when connected, define a continuous chamber 46 having positioned therein a plurality of polymer solution dispersing stations 48, 50, 52, 54 and 56. The lowermost tube 42 of the apparatus 40, like the tube 12 of the apparatus 10, has openings at the inlet end thereof for coupling a polymer solution conduit 58 and a fluid diluent conduit 60 thereon. A discharge conduit 62 is provided at the outlet end of the upper tube 44. The relative dimensions of the conduits 58 and 60 are the same as those of the conduits 14 and 16 of the apparatus shown in FIG. 1.

Each of the dispersing stations in the chamber 40 is separated from the next succeeding station by flow control elements 64, 66, 68 and 70. The flow control elements may comprise static mixers of the type sold under the designations Sulzer SMX, SMV or SMXL, manufactured by Koch Engineering Company, Inc., Wichita, Kan., U.S.A., for example. The flow control element function primarily to regulate the flow pattern of the polymer solution as it passes from one dispersing station to the next, and tend to impart uniformity to the solution. The elements 64, 66, 68 and 70, as shown, each comprise a plurality of vertically and circumferentially spaced units. It should be understood, of course, that the number and construction of the elements 64, 66, 68 and 70 may be varied to meet the specific requirements of the polymer solution being processed.

In the embodiment 40 shown in FIG. 2, the station 48 comprises a pair of perforated metal disks 48*a* and 48*b*, each having perforations of different size. Thus, for example, the disk 48*a* may have perforations approximately 3/16 inch in diameter, while the disk 48*b* may have perforations of the order of ⅛ inch in diameter. The station 50, as shown, comprises a pair of spaced metal disks 50*a*–50*a* and a pair of spaced screens 50*b*–50*b*. The perforations in the disks 50*a*–50*a* may be approximately 1/16 inch in diameter. The screens 50*b*–50*b*, on the other hand, may have a mesh size of about 16. The station 52 comprises three spaced screens 52*a*, 52*b* and 52*c*, the screen 52*c* being spaced a distance from the screen 52*b* greater than that between the screens 52*a* and 52*b*. Each of the screens comprising the station 52 may have a mesh size of about 20. The station 54, as shown, comprises two spaced screens having a mesh size of about 40. The uppermost station 56, as shown, comprises four equally spaced screens 56*a*, each having a mesh size of about 40. The apparatus 40, like the apparatus 10 shown in FIG. 1, advantageously is provided with a distributor disk or plate 72 at the inlet end thereof for initially dispersing the polymer solution as it enters the chamber 46.

The embodiment of the apparatus shown in FIG. 3, and designated generally by reference numeral 80, like the embodiments of the apparatus illustrated in FIGS. 1 and 2, comprises an elongated cylinder or tube 82. The tube 82 is provided with openings at the inlet end 82*a* thereof for receiving a polymer solution conduit 84 and a fluid diluent conduit 86. The outlet end 82*b* of the tube 82 is provided with an opening for receiving an end of a discharge conduit 88.

The tube 82 defines a chamber 90 in which a plurality of polymer solution dispersing stations 92, 94 and 96 are positioned. The chamber 90 also has positioned therein flow control means 98 and 100 which may comprise static mixers of the type referred to in connection with the description of the embodiment of the invention shown in FIG. 2. The station 92 desirable comprises spaced, metal disks **92*a* having perforations therethrough of approximately 3/16 inch in diameter. The station 94 is formed of both perforated metal disks or plates, and screens. The lowermost two elements 94*a*–94*a* of the station 94 comprise perforated metal plates having openings therethrough of about ⅛ inch in diameter. The next six elements of the station 94 comprise perforated plates 94*b* and screens 94*c* alternately arranged with relation to one another. The plates 94*b* each have perforations therethrough of about 1/16 inch in diameter. The screens 94*c* have a mesh size of approximately 16. The uppermost portion of the station 94, likewise, comprises metal disks 94*d* and screens 94*e*, totalling five in number and alternately arranged with relation to one another. The disks 94*d* have perforations therethrough approximately 1/16 inch in diameter. The screens 94*e* have a mesh size of approximately 20. The station 96 of the apparatus 80 also comprises a plurality of metal disks and screens, totalling eleven in the embodiment illustrated. The arrangement of the disks and screens of the station 96 differs from the arrangement of the disks and screens comprising the station 94. Thus, the lowermost elements of the station 96 comprise metal disks 96*a* and screens 96*b*. The metal disks 96*a* are separated from each other by a screen 96*b*, and have perforations therethrough approximately 1/32 inch in diameter. The screens 96*b* each have a mesh size of approximately 40. The uppermost three elements of the station 96 comprise metal plates 96*c***, each having openings therethrough of about 1/32 inch in diameter.

The inlet **82*a* of the apparatus 80 shown in FIG. 3 is provided with a polymer solution distributor 110. As illustrated, the distributor 110 includes a coupling 112 which carries a cylindrical, perforated sleeve 114. The perforations in the sleeve 114 are about 1/16 inch in diameter. The sleeve 114 is adapted to receive a cap 116 to which a plurality of spaced blades or paddles 118 are secured. The blades of paddles 118 advantageously are static, and function as polymer distribution elements for the dispersed polymer solution passing through the openings in the sleeve 114. Alternatively, the paddles may be motor-driven at a controlled rate to accelerate dispersion of the polymer solution as it enters the inlet end of the chamber 90. A cone-shaped ring 120 is secured on the coupling 112. The ring 120 acts to increase the velocity of the fluid diluent along the perforated sleeve 114 to facilitate and enhance initial dispersion of the polymer in the fluid diluent as it enters the chamber 90 through the conduit 86**.

The operation of the apparatus shown in FIGS. 1, 2 and 3 is somewhat similar in that each embodiment is adapted to initially disperse the polymer solution as it is introduced into each of the chambers 20, 46 and 90 to increase the surface area of the polymer comprising the solution. By thus increasing the surface area and exposing new areas of the polymer, the ability of the polymer to take-up or absorb the fluid diluent is substantially enhanced. As the polymer solution passes through the successive stations of each embodiment of the apparatus, the decreasing size of the openings or perforations of the elements comprising each of the stations acts to further disperse and, thus, increase the surface area, and expose previously unexposed areas, of the polymer in the solution, so that greater and greater amounts of the fluid diluent will be taken-up or absorbed by the polymer. The volume of polymer solution and fluid diluent introduce into the chamber of each of the embodiments is such that when the polymer solution reaches the outlet end of each of the chambers, the polymer will have taken-up or absorbed an amount of fluid diluent sufficient to reduce the concentration of the polymer in the solution to a preselected level. In utilizing the apparatus to dilute solutions of polymers such as partially hydrolyzed polyacrylamides, for example, the volume of fluid diluent, namely, water, employed can be of the order of about 2 to 120 times that of the polymer. Thus, by way of illustration, in forming a 1% solution of a partially hydrolyzed polyacrylamide from a 6% starting solution of the polymer, the 6% solution will be introduced into the apparatus at a rate of approximately 1 to 1.5 gallons per minute, while at the same time the fluid diluent, that is, water, will be introduced at the rate of approximately 6 to 6.5 gallons per minute. The pressure drop across the system in diluting a 6% solution of the partially hydrolyzed polyacrylamide to a 1% solution will generally be of the order of 20 to 25 psi.

The diluted material passing from the discharge conduit of the apparatus is substantially uniform. However, in certain instances, it is desirable to transfer the diluted material to a holding tank for a short period of time of the order of ½ to one hour to enable the diluted solution to self-adjust to an even distribution of the polymer throughout the solution. As indicated above, the 1% solution of the partially hydrolyzed polyacrylamide is ready for further dilution to provide a material of the desired concentration for immediate injection into an input well, for example, of an oil-bearing reservoir.

While, as stated above, it is preferred from the standpoint of the overall efficiency of the operation of the apparatus, that the size of the perforations in the members comprising the successive stations progressively decreases from the inlet end of the chamber to the outlet end thereof, dilution of polymer solutions can be achieved with perforated members having openings therethrough which are substantially of the same size at all stations in the chamber. However, the use of perforated members having larger size openings at each station requires the use of an appreciably greater number of dispersing stations, and, therefore, a longer chamber. The increased number of stations, coupled with the need for a longer chamber to accommodate the added stations, results in longer processing times to attain a desired dilution level. If the openings of the members at each station are substantially the same size, but relatively small, the pressure drop through the first two or three stations will be very high, and fluctuate widely due to "damming up" of the polymer solution, followed by a breakthrough of the solution.

The dilution of the polymer solution with the apparatus of the present invention can be carried out without the need for heating either the polymer solution or the diluent fluid. The use of conduit flow means, such as static mixers, in an optional feature of the apparatus. However, the flow control means does serve an important function in that it improves the flow pattern of the polymer solution as it passes from one station to the next, and tends to impart overall uniformity to the solution.

While the apparatus and method of the present invention have been described with relation to specific embodiments of apparatus and types of polymer solutions, it should be understood that such description has been given by way of illustration and example and not by way of limitation.

What is claimed is:

1. Apparatus for diluting polymer solutions having a gel-like consistency to provide a polymer solution having a substantially non-gel-like consistency while at the same time minimizing polymer degradation as the polymer solution is undergoing a physical change from a gel-like consistency to a substantially non-gel-like consistency, comprising: an elongated chamber having an inlet for introducing a polymer solution having a gel-like consistency into the chamber and an outlet for removing the polymer solution in a substantially non-gel-like form from the chamber; polymer solution distributor means within the chamber at the inlet thereof for initially dispersing and increasing the surface area of the gel-like polymer solution as it is introduced into the chamber; conduit means at the inlet of the chamber for introducing a fluid diluent to be absorbed by the gel-like polymer solution; at least three polymer solution dispersing stations positioned in longitudinally spaced relation to one another along the length of the chamber, each of the stations in the chamber including at least two perforated members, each member of a station having a plurality of small openings of substantially the same size therethrough, the openings in the perforated members of the station adjacent the inlet of the chamber being larger than the openings in the perforated members of the other stations in the chamber; flow control elements positioned in the chamber between each of the polymer solution dispersing stations, said flow control elements acting to substantially eliminate shear forces which may tend to degrade the polymer comprising the polymer solution, the perforated members of each station being arranged with respect to each other and with respect to the perforated members of each of the other stations and with respect to the flow control elements to provide an uninterrupted, continuous, non-turbulent flow of the polymer solution from one station to the next station, the size of the perforations in the perforated members at each station being such that the surface area of the gel-like polymer solution exposed to the fluid diluent will be progressively increased at each successive station to enable larger volumes of the fluid diluent to be absorbed by the gel-like polymer solution until the polymer solution is in a substantially non-gel like form when it exits from the chamber and the polymer will have undergone essentially no degradation.

2. Apparatus according to claim 1 wherein the polymer solution distributor means includes a perforated cylinder having a plurality of circumferentially arranged deflector blades positioned at one end thereof.

3. Apparatus according to claim 2 wherein the flow control means includes static mixers which act to achieve substantially even flow of the polymer solution between the dispersing stations.

4. Apparatus according to claim 1 wherein the perforated members at the polymer solution station adjacent to the inlet of the chamber comprises at least two plates wherein the perforations in one of the plates differs in size from the perforations in the other plate.

5. Apparatus according to claim 1 wherein conduit means is provided for introducing the gel-like polymer solution into the chamber at a point in the chamber downstream from the point in the chamber where the fluid diluent to be absorbed by the polymer solution is introduced into the chamber.

6. Apparatus according to claim 2 wherein drive means are provided for rotating the deflector blades on the perforated cylinder.

* * * * *